(12) United States Patent
Lee

(10) Patent No.: US 10,768,694 B2
(45) Date of Patent: Sep. 8, 2020

(54) HMD DEVICE AND CONTROL METHOD THEREFOR

(71) Applicant: SAMSUNG ELECTRONICS CO., LTD., Suwon-si, Gyeonggi-do (KR)

(72) Inventor: Sang-young Lee, Anyang-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 93 days.

(21) Appl. No.: 16/062,402

(22) PCT Filed: Nov. 22, 2016

(86) PCT No.: PCT/KR2016/013497
§ 371 (c)(1),
(2) Date: Jun. 14, 2018

(87) PCT Pub. No.: WO2017/126797
PCT Pub. Date: Jul. 27, 2017

(65) Prior Publication Data
US 2018/0356884 A1    Dec. 13, 2018

(30) Foreign Application Priority Data
Jan. 22, 2016 (KR) .......... 10-2016-0008202

(51) Int. Cl.
*G09G 5/00* (2006.01)
*G06F 3/01* (2006.01)
(Continued)

(52) U.S. Cl.
CPC .......... *G06F 3/012* (2013.01); *G02B 27/017* (2013.01); *G06F 3/013* (2013.01);
(Continued)

(58) Field of Classification Search
USPC .................. 345/156, 8, 2.1, 7, 9; 600/111
See application file for complete search history.

(56) References Cited

U.S. PATENT DOCUMENTS

| 5,742,263 A | 4/1998 | Wang et al. |
| 7,224,326 B2 | 5/2007 | Sefton |

(Continued)

FOREIGN PATENT DOCUMENTS

| JP | 2013-168910 | 8/2013 |
| KR | 10-2011-0080915 | 7/2011 |

(Continued)

OTHER PUBLICATIONS

International Search Report for PCT/KR2016/013497, dated Jan. 10, 2017, 4 pages.
(Continued)

*Primary Examiner* — Thuy N Pardo
(74) *Attorney, Agent, or Firm* — Nixon & Vanderhye, P.C.

(57) ABSTRACT

Disclosed is a head mounted display (HMD) device. A HMD device for providing a service that provides a virtual reality (VR) image comprises: a display; a sensor for sensing a direction to which the HMD device is oriented; and a processor for controlling the display to provide a first part of the VR image when the sensed direction to which the HMD device is oriented is changed within a predetermined range on the basis of the front of a user, and to provide a second part of the VR image when the sensed direction to which the HMD device is oriented is changed to escape from the predetermined range on the basis of the front of the user.

15 Claims, 15 Drawing Sheets

(51) Int. Cl.
*G06F 3/0481* (2013.01)
*G02B 27/01* (2006.01)
*H04S 3/00* (2006.01)
*H04S 7/00* (2006.01)

(52) U.S. Cl.
CPC .......... *G06F 3/04815* (2013.01); *H04S 3/008* (2013.01); *H04S 7/303* (2013.01); *G02B 2027/0187* (2013.01)

(56) References Cited

U.S. PATENT DOCUMENTS

| | | | |
|---|---|---|---|
| 7,385,624 | B2 | 6/2008 | Takehara et al. |
| 8,730,127 | B2 | 5/2014 | Pedro |
| 9,007,440 | B1 | 4/2015 | Jones et al. |
| 9,423,620 | B2 | 8/2016 | Cho |
| 9,523,854 | B2 | 12/2016 | Kuriya et al. |
| 2004/0174337 | A1* | 9/2004 | Kubota .................. G06F 3/016 345/156 |
| 2005/0156817 | A1 | 7/2005 | Iba |
| 2007/0173689 | A1* | 7/2007 | Ozaki .................... A61B 1/042 600/111 |
| 2007/0229397 | A1* | 10/2007 | Sefton ................ A63B 71/0622 345/8 |
| 2008/0129688 | A1 | 6/2008 | Richardson et al. |
| 2013/0063477 | A1 | 3/2013 | Richardson et al. |
| 2013/0093789 | A1 | 4/2013 | Liu et al. |
| 2015/0009132 | A1 | 1/2015 | Kuriya et al. |
| 2015/0062293 | A1 | 3/2015 | Cho et al. |
| 2015/0288944 | A1* | 10/2015 | Nistico .............. G02B 27/0172 345/156 |
| 2015/0309310 | A1 | 10/2015 | Cho et al. |
| 2015/0309311 | A1 | 10/2015 | Cho |
| 2016/0018645 | A1 | 1/2016 | Haddick et al. |
| 2016/0033770 | A1* | 2/2016 | Fujimaki ............... G06T 19/006 345/8 |
| 2016/0035140 | A1* | 2/2016 | Bickerstaff ............. A63F 13/26 345/633 |
| 2016/0041388 | A1* | 2/2016 | Fujimaki .............. G02B 27/017 345/2.1 |
| 2016/0187969 | A1* | 6/2016 | Larsen .................... G06F 3/012 345/156 |
| 2016/0196603 | A1* | 7/2016 | Perez ................. G06K 9/00671 345/633 |

FOREIGN PATENT DOCUMENTS

| | | |
|---|---|---|
| KR | 10-215-0026201 | 3/2015 |
| KR | 10-2015-0122355 | 11/2015 |
| KR | 10-2015-0122975 | 11/2015 |

OTHER PUBLICATIONS

Written Opinion of the ISA for PCT/KR2016/013497, with English translation, dated Jan. 10, 2017, 11 pages.
Extended European Search Report dated Nov. 22, 2018 in counterpart European Patent Application No. 16886640.8.
Ngoc, Luan Le et al., "Evaluating usability of ampified head rotations on base-to-final turn for flight simulation training devices," 2013 IEEE Virtual Reality (VR), IEEE, Mar. 18, 2013, pp. 51-54.
Bolte, Benjamin et al., "Augmentation techniques for efficient exploration in head-mounted display environments," Proceedings of the 17th ACM Symposium on Virtual Reality Software and Technology, Hong Kong, Nov. 22- 24, 2010, ACM, New York, NY, pp. 11-18.
Communication pursuant to Article 94(3) EPC dated Nov. 25, 2019 in counterpart European Patent Application No. 16886640.8.

\* cited by examiner

100

(a)          (b)

100

(a)

(b)

(a)

(b)

(a)

(b)

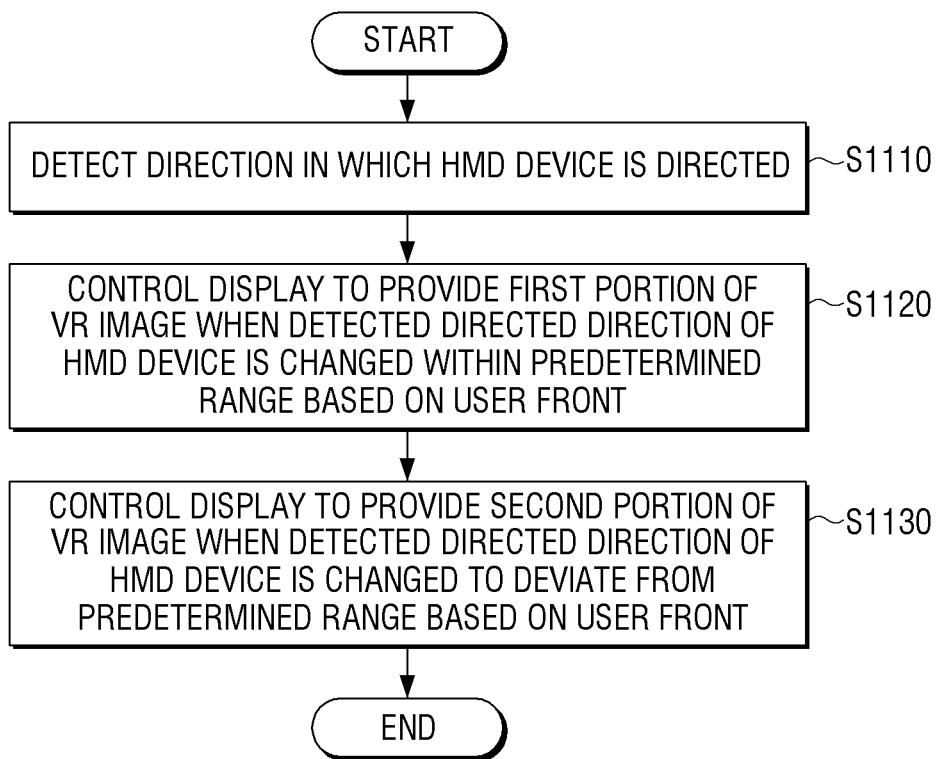

HMD DEVICE AND CONTROL METHOD THEREFOR

This application is the U.S. national phase of International Application No. PCT/KR2016/013497 filed 22 Nov. 2016, which designated the U.S. and claims priority to KR Patent Application No. 10-2016-0008202 filed 22 Jan. 2016, the entire contents of each of which are hereby incorporated by reference.

BACKGROUND

Technical Field

Apparatuses and methods consistent with the present disclosure relate to a head mounted display (HMD) device and a method of controlling the same, and more particularly, to a HMD device and a method of controlling the same, for watching a virtual reality (VR) imager in a limited turning range.

Description of Related Art

Recently, along with development of electronic technology, display apparatuses wearable on a user head have been developed as an apparatuses for displaying visual information to a user in various forms. Such a display apparatus wearable on the head is referred to as a head mounted display (HMD) device and displays a virtual reality (VR) world through a display for displaying an image in front of user eyes or displays an image of augmented reality (AR) along with an actual external world.

Conventionally, an HMD device displays a viewing area, which corresponds to a visual field of a direction corresponding to a direction in which a user head rotates, of a virtual reality (VR) image in all directions to display a realistic image according to movement of a user who wears the device.

However, since a view of a user who wears an HMD device is blocked from an external world, the user is inconvenienced by sitting during use of the HMD device for safety and inconvenienced by turning the waist and sitting in a changed position to see a rear VR image in a sitting posture.

SUMMARY

The present disclosure provides a head mounted display (HMD) device and a method of manufacturing the same, for watching a virtual reality (VR) image in a limited turning range.

According to an aspect of the present disclosure, a head mounted display (HMD) device for providing a service for providing a virtual reality (VR) image includes a display, a sensor configured to detect a direction in which the HMD device is directed, and a processor configured to control the display to display a view region corresponding to a different direction from the detected directed direction from the VR image to entirely display the VR image for providing the VR service within a predetermined turning radius of the HMD device.

In this case, the sensor may detect an azimuth on a horizontal plane, in which the HMD device is directed from the front and the processor may control the display to display a view region corresponding to a direction of a greater angle than the detected azimuth from the VR image.

When the detected directed direction is less than a threshold angle based on the front, the processor may control the display to display a view region corresponding to the same direction as the detected directed direction and, when the detected directed direction is equal to or greater than the threshold angle, the processor may control the display to display a view region corresponding to a direction that is further turned from the detected directed direction.

In this case, the threshold angle may be a minimum angle for displaying a region in a range of 180 degrees of the VR image based on the user front through the view region.

The processor may set a maximum turning radius for turning the head according to user input and, to entirely display the VR image in the set maximum turning radius, the processor may control the display to display a view region corresponding to a different direction from the detected directed direction from the VR image.

The processor may control the display to display a view region corresponding to a direction that is further turned from the detected directed direction in a direction of a position adjacent to opposite ends when the directed direction is detected at the opposite ends of the predetermined turning radius.

The HMD device may further include a sensor configured to detect gaze of a user who wears the HMD device, wherein the processor controls the display to display a view region corresponding to a direction that is further turned from the detected directed direction in a direction of a positioned adjacent to an edge when the detected gaze of the user is directed toward the position adjacent to the edge of the view region.

The HMD device may further include an audio interface configured to output stereoscopic sound, the processor controls the audio interface to output sound in such a way a direction toward a position in which a sound source reproduced by the stereoscopic sound is reproduced corresponds to a view region corresponding to a different direction from the detected directed direction.

The processor may control the display to display a view region toward a direction of an angle obtained by multiplying an angle of the detected directed direction based on the user front with a positive multiplier greater than 1 from the VR image.

In this case, the multiplier may be varied according to the angle of the direction of the HMD device is directed based on the user front.

According to an aspect of the present disclosure, a method of controlling a head mounted display (HMD) device for providing a service for providing a virtual reality (VR) image includes detecting a direction in which the HMD device is directed and controlling the display to display a view region corresponding to a different direction from the detected directed direction from the VR image to entirely display the VR image for providing the VR service within a predetermined turning radius of the HMD device.

In this case, the detecting may include an azimuth on a horizontal plane, in which the HMD device is directed from the front and the processor may control the display to display a view region corresponding to a direction of a greater angle than the detected azimuth from the VR image.

When the detected directed direction is less than a threshold angle based on the front, the controlling may include controlling the display to display a view region corresponding to the same direction as the detected directed direction and, when the detected directed direction is equal to or greater than the threshold angle, the processor may control the display to display a view region corresponding to a direction that is further turned from the detected directed direction.

In this case, the threshold angle may be a minimum angle for displaying a region in a range of 180 degrees of the VR image based on the user front through the view region.

The method may further include setting a maximum turning radius for turning the head according to user input and the controlling may include controlling the display to display a view region corresponding to a different direction from the detected directed direction from the VR image, to entirely display the VR image in the set maximum turning radius.

The controlling may include controlling the display to display a view region corresponding to a direction that is further turned from the detected directed direction in a direction of a position adjacent to opposite ends when the directed direction is detected at the opposite ends of the predetermined turning radius.

The method may further include detecting gaze of a user who wears the HMD device, wherein the controlling may include controlling the display to display a view region corresponding to a direction that is further turned from the detected directed direction in a direction of a positioned adjacent to an edge when the detected gaze of the user is directed toward the position adjacent to the edge of the view region.

The method may further include outputting stereoscopic sound, and the controlling may include controlling the audio interface to output sound in such a way a direction toward a position in which a sound source reproduced by the stereoscopic sound is reproduced corresponds to a view region corresponding to a different direction from the detected directed direction.

The method may further include controlling the display to display a view region toward a direction of an angle obtained by multiplying an angle of the detected directed direction based on the user front with a positive multiplier greater than 1 from the VR image.

In this case, the multiplier may be varied according to the angle of the direction of the HMD device is directed based on the user front.

Advantageous Effects

A head mounted display (HMD) device and a method of controlling the same according to various exemplary embodiments of the present disclosure may have the following effects.

According to an exemplary embodiment of the present disclosure, a user may comfortably watch a virtual reality (VR) image in all directions even in a limited available range of the user had.

According to another exemplary embodiment of the present disclosure, the user may set a unique turning radius for each person and may watch a VR image in all directions in the set turning radius.

According to another exemplary embodiment of the present disclosure, the user may experience a realistic audio effect corresponding to a direction of a view region that the user is watching.

BRIEF DESCRIPTION OF THE DRAWINGS

FIG. 11 is a flowchart for explanation of a method of controlling an HMD device according to an exemplary embodiment of the present disclosure.

DETAILED DESCRIPTION OF EXAMPLE EMBODIMENTS

Figure 1A:
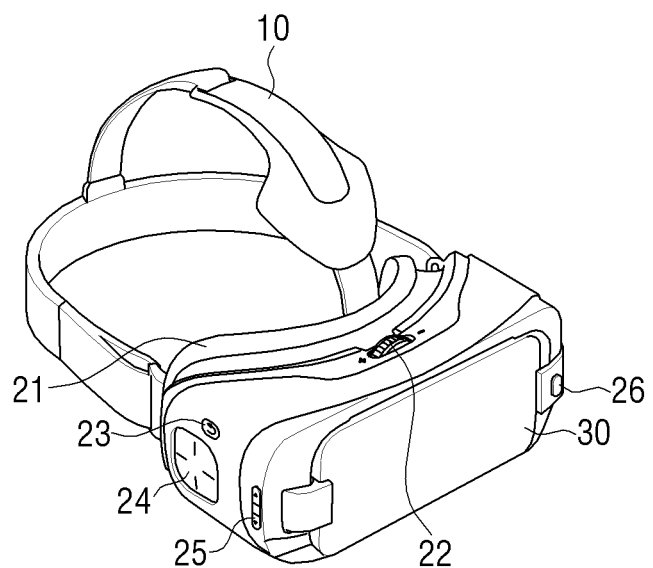
FIG. 1A is a diagram showing an outer appearance of an HMD device according to an exemplary embodiment of the present disclosure.

Certain exemplary embodiments of the present disclosure will now be described in greater detail with reference to the accompanying drawings. In the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

FIG. 1 is a view showing an outer appearance of an HMD device according to an exemplary embodiment of the present disclosure.

Referring to FIG. 1, the HMD device broadly includes two parts of a member 10 for enabling the device to be worn on the head and a body 20 that is closely positioned to the eyes to display an image.

The member 10 for enabling the device to be worn on the head may include one or plural straps 10. The strap 10 may include a main strap for surrounding the user head and an upper strap for surrounding an upper portion of the user head.

The body 20 may be connected to the strap 10. In detail, right and left opposite sides of the body 20 may be connected to the main strap and an upper central portion of the body 20 may be connected to the upper strap.

The body 20 may be positioned in front of the eyes of the user who wears the HMD device. In addition, the body 20 may include a manipulation unit for receiving user manipulation and a display unit for displaying an image. The body 20 may include a foam cushion 21 positioned at a portion that the user head contacts to provide a comfortable fit.

The body 20 may include a lens focusing wheel 22, a cancel button 23, a touch detection sensor 24, a volume control button 25, and a decoupling button 26.

The lens focusing wheel 22 may receive user manipulation of adjusting focuses of two lenses of the body 20, corresponding to both eyes of the user, respectively. In detail, the lens focusing wheel 22 may receive user manipulation for turning and move forward or backward a lens positioned between the user eyes and a display surface to provide manipulation of adjusting a focus for watching an image of the display.

The cancel button 23 may receive user manipulation of returning to a previous image, stopping a reproduced image, or returning to a menu when an image is changed by stages like a menu displayed on a display. The cancel button 23 may execute different functions depending on a pushing time period. For example, when the cancel button 23 is pushed for a long time, a home image or a universal menu may be displayed on the display.

The touch detection sensor 24 may receive user touch manipulation. In detail, the touch detection sensor 24 may receive a selection touch, two consecutive touches, a drag touch with directivity, or the like.

The volume control button 25 may receive user manipulation of adjusting a volume of output sound. The volume control button 25 may include a button for volume up and a button for volume down.

The decoupling button 26 may receive user manipulation of decoupling a coupled electronic device 30 from the body 20. In detail, the decoupling button 26 may provide manipulation of electrically separating a fixing member for fixing the electronic device 30 that is electrically connected to the body 20 from the electronic device 30 to be decoupled therefrom.

The body 20 may be coupled to the electronic device 30. The electronic device 30 may include a display and store a program for realizing virtual reality (VR). In detail, while being coupled to the body 20, the electronic device 30 may store an image to be appropriately displayed to a user who wears an HMD device 100 and a program for executing a function corresponding to user manipulation through a manipulation unit of the body 20.

The body 20 may include a fixing frame corresponding to a shape of the electronic device 30 for physical coupling to a connector for electrical connection with the electronic device 30. To prevent external shocks and prevent the electronic device 30 from being separated, the body 20 may be further coupled to a cover (not shown) for covering the electronic device 30.

The electronic device 30 may be various types of mobile terminals. For example, the electronic device 30 may be a device including a display, such as a smart phone, a tablet personal computer (PC), a personal digital assistant (PDA), a portable multimedia player (PMP), or a wearable device.

Figure 1B:
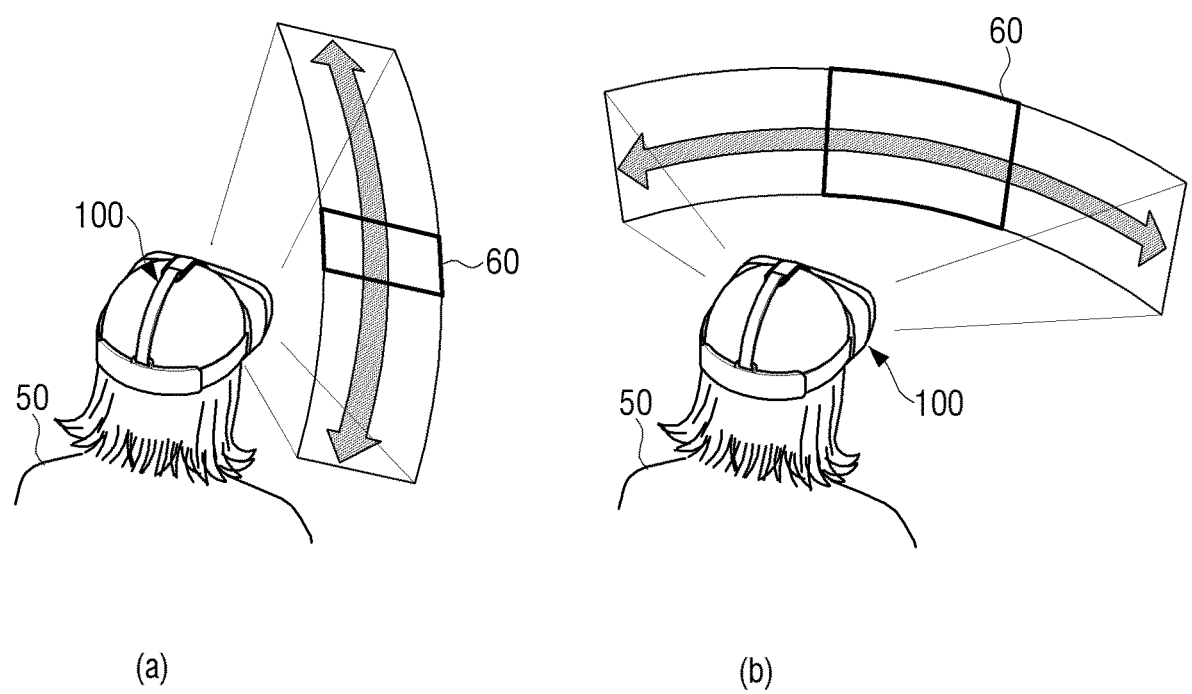
FIG. 1B is a diagram for explanation of a state in which the HMD device of FIG. 1A is worn and used.

FIG. 1B is a diagram for explanation of a state in which the HMD device of FIG. 1A is worn and used.

Referring to FIG. 1B, a user 50 who wears the HMD device 100 may see only a portion of a reproduced VR image through a view region 60. Here, the view region 60 may refer to a region to be seen by the user 50 through a display in a closed space that hides a front view of the user 50. The view region 60 may be a viewing range or a viewing angle of the user 50 in VR. The reproduced VR image may include an image corresponding to three axes of a three-dimensional (3D) space to allow the user 50 to visually feel a virtual space.

Referring to FIG. 1B, the user 50 who wears the HMD device 100 may move the head in up and down directions and, according to movement of the head, the user 50 may see upper and lower portions of the VR image through the view region 60.

Referring to (b) of FIG. 1B, the user 50 who wears the HMD device 100 may turn the head in right and left directions and, according to movement of the head, the user 50 may see left and right portions of the VR image through the view region 60.

Figure 2:
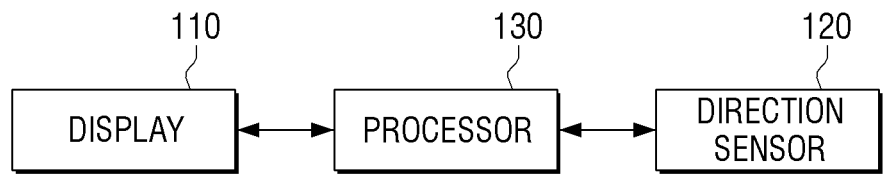
FIG. 2 is a block diagram showing a configuration of an HMD device according to an exemplary embodiment of the present disclosure.

FIG. 2 is a block diagram showing a configuration of an HMD device according to an exemplary embodiment of the present disclosure.

Referring to FIG. 2 the HMD device 100 may include a display 110, a direction sensor 120, and a processor 130.

The display 110 may display an image. In detail, the display 110 may display a portion of a VR image for providing a VR service as a view region. The VR service may refer to a service for providing content to a user to feel feeling of space of VR and the VR image may refer to an image formed by reproducing an image corresponding to 3D coordinates by the HMD device 100 to allow a user to visually feel as if they are in a 3D space through the display 110, as described above.

The direction sensor 120 may detect a direction in which the HMD device 100 is directed. In detail, the direction sensor 120 may detect a direction in which the HMD device 100 is moved according to user movement. The direction sensor 120 may be embodied as various sensors such as an acceleration sensor, a gravity sensor, or a geomagnetic sensor, which is described below in more detail with reference to FIG. 3.

The direction sensor 120 may detect an azimuth at which the HMD device 100 is directed on a horizontal plane based on the front. In detail, the direction sensor 120 may detect an azimuth at which the HMD device 100 is turned on a horizontal plane according to right and left movement of the user head based on the front of the HMD device 100, which corresponds to the user front determined when the HMD device 100 is worn in an initial state.

The processor 130 may control each component of the HMD device 100. In detail, the processor 130 may control a function of each component of the HMD device 100 to all VR image for providing a VR service within a range of a predetermined turning radius of the HMD device.

The processor 130 may control the display 110 to display a view region of the VR image, which corresponds to a different direction from a direction in which the HMD device is directed. In detail, the processor 130 may control the display 110 to control a first portion of the VR image when the detected direction in which the HMD device is directed is changed within a predetermined range based on the user front. Here, the first portion of the VR image may have right and left images which have the same size based on the changed direction in which the HMD device is directed. That is, the first portion provided through the display 110 may be a region of the VR image, which is displayed while the direction of the HMD device 100 is changed within a predetermined range, and may be a region corresponding to a visual field, right and left sides of which are symmetrical to each other, in the same direction in the direction in which the HMD device 100 is directed.

The processor 130 may control the display 110 to provide a second portion of the VR image when the detected direction in which the HMD device is directed is changed to be outside a predetermined range based on the user front. Here, the second portion of the VR image may have right and left images with different sizes based on the changed direction in which the HMD device is directed. That is, the second portion provided through the display 110 may be a region of the VR image, which is displayed while the direction of the HMD device 100 is changed in the other range outside the predetermined range, and may be a region corresponding to corresponding to a visual field, right and left sides of which are inclined based on the direction in which the HMD direction is directed.

In other words, the processor 130 may control the display 110 to display a region corresponding to a direction that does not correspond to the direction in which the HMD device is directed, which is detected by the direction sensor 120, as a view region in at least a portion of the reproduced VR image. In detail, the HMD device 100 may display the VR image in such a way that a direction of a virtual space that is logically present in the VR image and the direction in which the HMD device 100 is directed do not correspond to each other.

With regard to the second portion of the VR image, when the direction in which the HMD device 100 is directed is right based on the user front, a right image has a larger size than a left image and, when the direction in which the HMD device 100 is directed is left, the left image has a larger size than the right image. That is, the second portion may be an image of a region corresponding to a direction in which the HMD device 100 is turned based on the front, which is displayed when the HMD device is changed to be outside a predetermined range.

That is, the processor 130 may control the display 110 to display a view region of the VR image, corresponding to a direction by which a larger angle is formed than the detected azimuth. As such, the processor 130 may control the display 110 to display a portion of the VR image in a direction that is further turned compared with a direction in which the HMD device 100 is turned by turning the user head, as a view region.

The processor 130 may set a direction as a reference for determination of turning and predetermined ranges of the HMD device 100. In general, the direction as the reference may be a direction in which the user head is directed. The processor 130 may guide the user to be directed toward the front in a correct posture and, then, may set a direction of the HMD device 100 in an initial state as the front as the reference. To this end, the HMD device 100 may further perform calibration for turning.

According an exemplary embodiment, the processor 130 may set a threshold angle corresponding to a predetermined range based on the user front. The threshold angle may be an angle of a boundary between a range in which a first portion is displayed based on the front and a range in which a second portion is displayed. That is, the threshold angle may be an angle between opposite ends within a predetermined range.

The processor 130 may determine an azimuth to a direction in which the HMD device 100 is directed from a direction of the user front. The azimuth may be an angle by which the HMD device 100 is turned to the direction in which the HMD device 100 is directed from the front direction as the reference.

The processor 130 may compare a size of the determined azimuth and the predetermined threshold angle and may control the display 110 to provide the first portion or the second portion according to a comparison result. That is, the processor 130 may control the display 110 to display a view region corresponding to a direction corresponding to the detected direction in which the HMD device is directed when the detected direction is less than the threshold angle based on the front and to display a view region corresponding to a direction that is further turned compared with the detected direction when the detected direction is equal to or greater than the threshold angle. In detail, the processor 130 may display a view region corresponding to the direction in which the HMD device 100 is directed when the HMD device 100 is directed within a predetermined partial radius of an entire predetermined turning radius and may display a view region corresponding to a direction that is further turned compared with a direction in which the HMD device 100 is turned based on the direction in which the HMD device 100 is directed.

Here, the threshold angle may be a minimum angle for providing a region in a range of 180 degrees of the VR image based on the user front with the first portion. That is, the threshold angle may be a range of a visual field and may be an angle between opposite ends within a predetermined range for displaying a region in a range of 180 degrees based on the front of the VR image. That is, the processor 130 may set the threshold angle to display the VR image in a range of 180 degrees based on the front as a view region of the first portion according to a direction in which the HMD device is directed and may display the display 110 to display a view angle of a second portion corresponding to a direction that is further turned compared with the direction in which the HMD device is directed with respect to a rear range of 180 degrees in which it is difficult to observe an image.

The processor 130 may set a maximum turning radius by which the HMD device is turned by turning the user head according to user input. In detail, the processor 130 may receive a user input for setting an entire turning available range in which the VR image is entirely seen and may set a maximum turning radius according to a received command. According to the present exemplary embodiment, the HMD device 100 may provide all VR images to the user within a maximum turning radius range in consideration of a degree that is different for each person.

In addition, the processor 130 may control the display 110 to display a view region of the VR image, which corresponds to a different direction from the detected direction in which the HMD device 100 is directed, to display all VR images within a maximum turning radius range that is set by user input.

To display the view region of the VR image, which corresponds to a different direction from the detected direction in which the HMD device 100 is directed, the processor 130 may control the display 110 to provide, as the first portion, an image within a range of a visual field directed at an angle obtained by multiplying an angle based on the direction in which the HMD device 100 is directed based on the user front by a positive multiplier greater than 1, which is represented according to Equation 1 below.

$$\theta_a = \alpha \times \theta_b \quad \text{[Equation 1]}$$

Here, $\alpha$ is a positive multiplier greater than 1, a multiplicand $\theta b$ is an angle corresponding to the detected direction in which the HMD device 100 is directed based on the front, and $\theta a$ is a direction of a VR image to be display as a view region.

Here, the multiplier $\alpha$ may be varied according to $\theta b$. For example, the multiplier $\alpha$ may be increased as the angle $\theta b$ in the detected direction in which the HMD device is directed is increased. Here, the multiplier may be continuously or intermittently increased.

The processor 130 may be embodied as a device for processing various commands. For example, the processor 130 may be embodied as an application specific integrated circuit (ASIC), an embedded processor, a micro processor, a hardware control logic, a hardware finite state machine (FSM), or a digital signal processor (DSP). The processor 130 may function as a CPU and may be operatively connected to an ROM and an RAM to write and read input and output signal and data.

The aforementioned HMD device 100 may provide a more comfortable VR service to a user during appreciation of a VR image.

Figure 3:
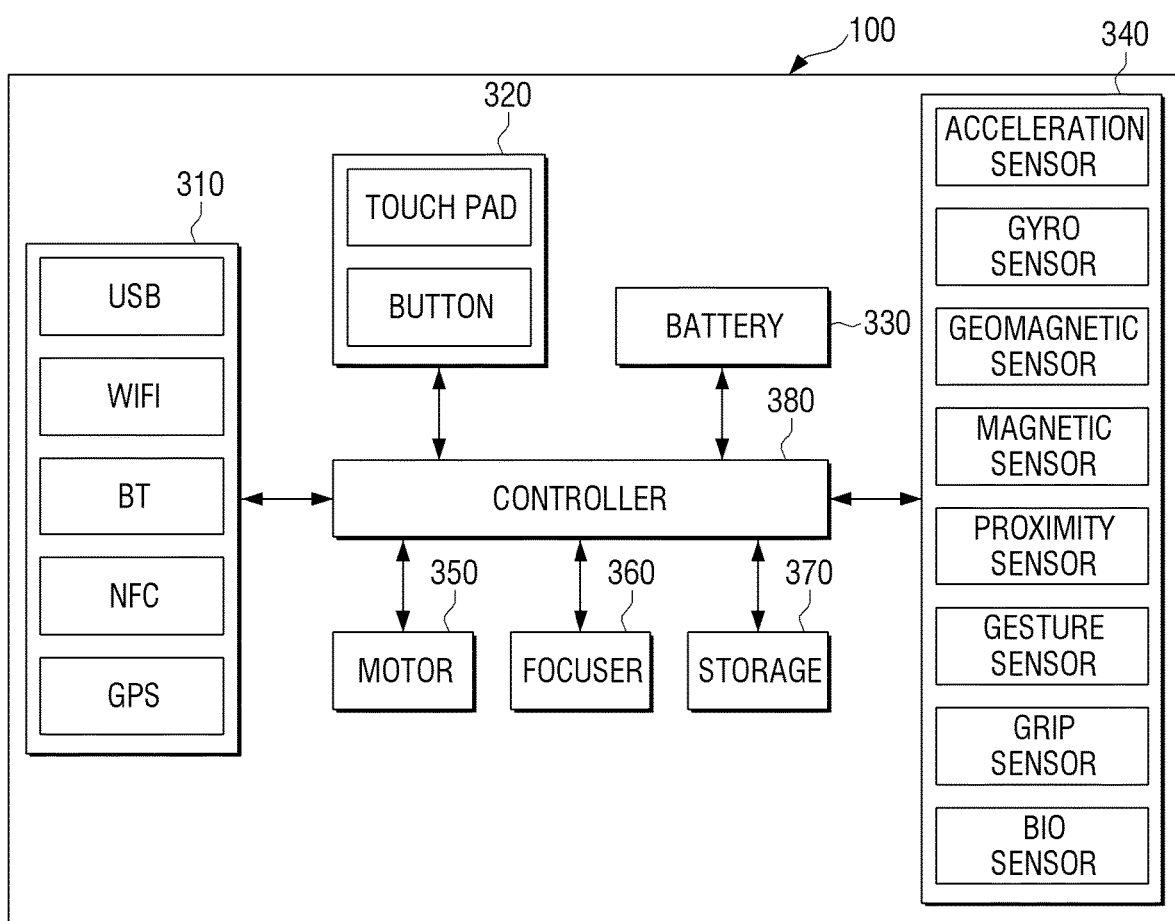
FIG. 3 is a block diagram showing components of the HMD device of FIG. 2 in detail.

FIG. 3 is a block diagram showing components of the HMD device of FIG. 2 in detail.

Referring to FIG. 3, the HMD device 100 may include a communicator 310, a manipulator 320, a power supply 330, a sensor 340, a motor 350, a focuser 360, a storage 370, and a controller 380.

The communicator 310 may communicate with an external device. In detail, the communicator 310 may communicate with an external device according to various communication standards. The communicator 310 may support wired and wireless communication methods. The communicator 310 may include a USB module for wired communication with an external device, a WiFi module for wireless LAN communication, a Bluetooth module and NFC module for short distance direct communication, and a GPS module for receiving a satellite signal for determination.

The manipulator 320 may include a touch pad for detection of user touch manipulation and button members for physical input.

The power supply 330 may supply power for driving the HMD device 100 and include a battery rechargeable with power.

The sensor 340 may include various sensors. An acceleration sensor may detect acceleration related to a direction and size of force due to movement of the HMD device 100. A gyro sensor may detect angular acceleration related to a turning direction and size of the HMD device 100. A geomagnetic sensor may detect a magnetic direction and size of the earth. A magnetic sensor may detect a direction and angle of a magnetic field and may be embodied as a hall device. A proximity sensor may detect presence of an object within a short distance and may determine whether a user wears the HMD device 100. A gesture sensor may detect movement of the user hand, the user finger, and a specific object and may enable separate input that is not performed by the manipulator 320. A grip sensor may detect pressure applied from the outside of the HMD device 100. A biosensor may detect a bio-signal of a user. For example, the biosensor may include at least one of a fingerprint sensor, an iris sensor, and an electrocardiogram (ECG) sensor.

The motor 350 may provide power for driving a cooling fan for control of heating of the HMD device.

The focuser 360 may move a position of an ocular lens of the HMD device. The focuser 360 may be included in the lens focusing wheel 22 of the HMD device 100 of FIG. 1.

The storage 370 may store programs and data for providing a VR service. In detail, the storage 370 may store information required for an operation of an HMD device, such as a driving program of the HMD device, content data for providing a VR image, a predetermined turning radius range, and an algorithm for determining a view region in proportion to an angle of a direction in which the HMD device is directed among VR images.

The controller 380 may control each component of the HMD device 100. The controller 380 may include a CPU, a RAM as a main memory device, and a ROM for storing a control program.

FIGS. 4A, 4B, 4C, and 4D are diagrams for explanation of a method of determining a region of a VR image of an HMD device, which is to be displayed to a user, according to an exemplary embodiment of the present disclosure.

In a description of FIGS. 4A-4D, an illustrated head 50 refers to a directed direction 410 of a user who wears the HMD device. A complete circle 420 around the head 50 may refer to a range of a VR image with a front image in 360 degrees. An arc 430 outside the circle 420 may indicate a predetermined turning radius range of 240 degrees. In this example, the HMD device may provide an entire range 420 of 360 degrees of a VR image even if the directed direction 410 of the head 50 is turned only in a range of 240 degrees of the arc 430.

Figure 4A:
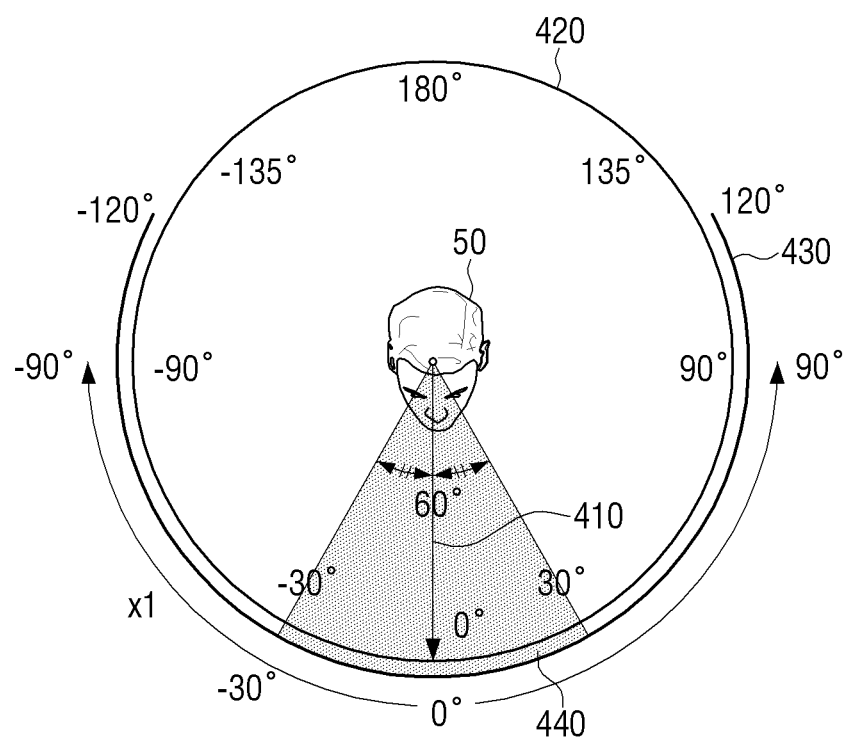
FIGS. 4A, 4B, 4C, and 4D are diagrams for explanation of a method of determining a region of a virtual reality (VR) image of an HMD device, which is to be displayed to a user, according to an exemplary embodiment of the present disclosure.

Referring to FIG. 4A, the directed direction 410 of the head 50 may be a forward direction. When the HMD device is directed forward, the HMD device may display a right and left range of a VR image 420 in 30 degrees from the directed direction 410 as a view region 440.

Figure 4B:
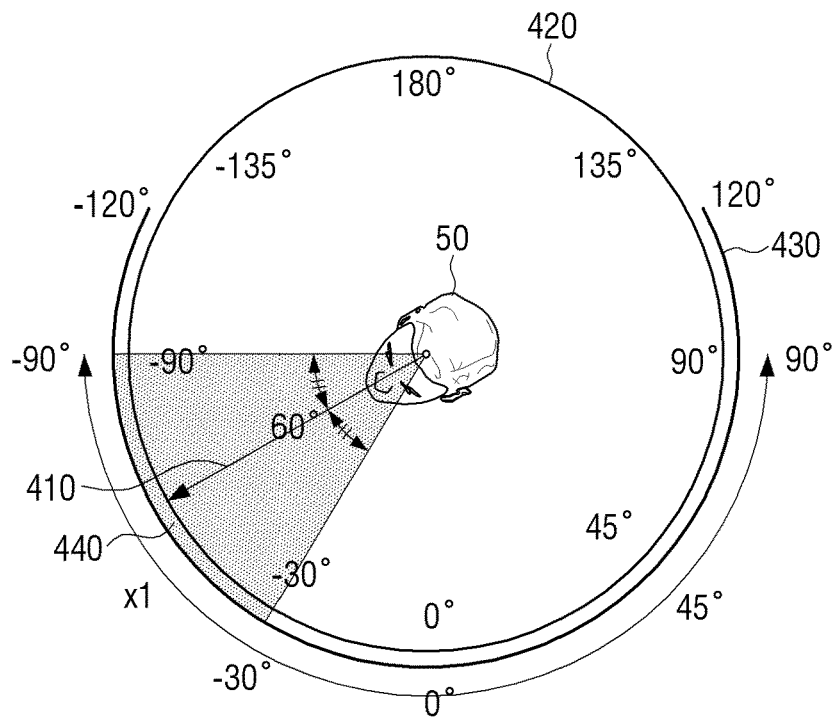
Figure 4B:
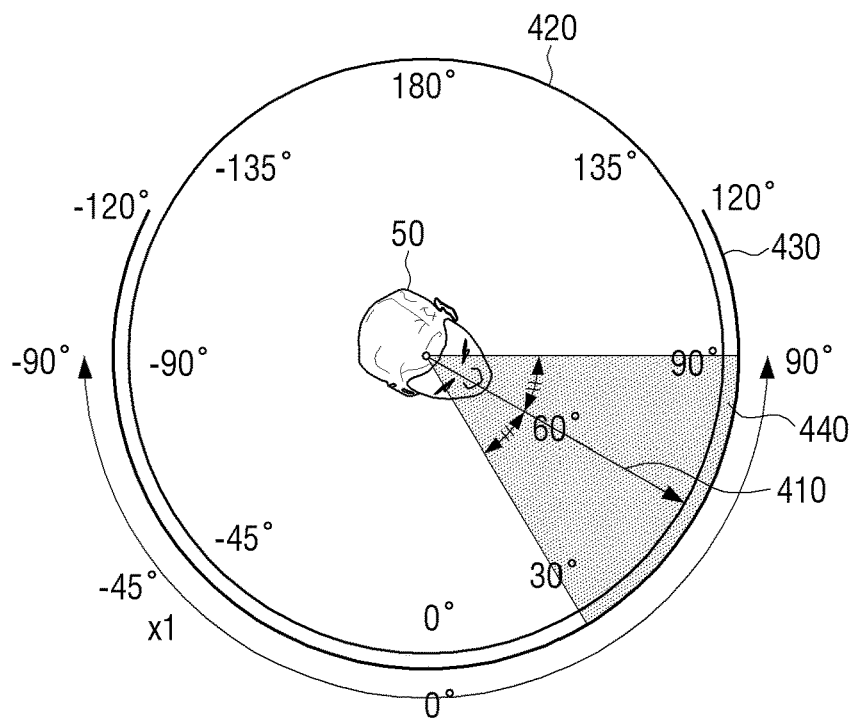

Referring to FIG. 4B, the directed direction 410 of the head 50 may refer to 60 degrees of a right side and 60 degrees of a left side. Referring to (a) of FIG. 4B, the HMD device may display a range, right and left portions of which are symmetrical to each other by 30 degrees based on the directed direction 410 of −60 degrees from a VR image 420, as the view region 440. That is, the HMD device may display a first portion 440, right and left images of which have the same size based on a direction of −60 degrees from the VR image 420. Referring to (b) of FIG. 4B, the HMD device may display a range, right and left portions of which are symmetrical to each other by 30 degrees based on the directed direction 410 of +60 degrees from the VR image 420, as the view region 440. That is, the HMD device may display the first portion 440, right and left images of which have the same size based on a direction of +60 degrees from the VR image 420. Here, it may be seen that when the directed direction 410 is −60 degrees to +60 degrees, a VR image is displayed in a forward direction of −90 degrees to +90 degrees.

According to an exemplary embodiment, the HMD device may set −60 degrees and +60 degrees at which a VR image in a range of 180 degrees at the user front as a reference, as a threshold angle at which the view region 440 is displayed in the same direction as the directed direction 410. When an angle of the directed direction 410 exceeds the threshold angle, the HMD device may display a view angle 410 corresponding to a direction that is further turned in the directed direction 410. That is, when an azimuth of the directed direction of the HMD device is within a threshold angle ±60 degrees, the HMD may provide a first portion, right and left images of which have symmetrical sizes and, when the azimuth is outside ±60 degrees, the HMD device may provide a second portion, right and left images of which have different sizes.

Figure 4C:
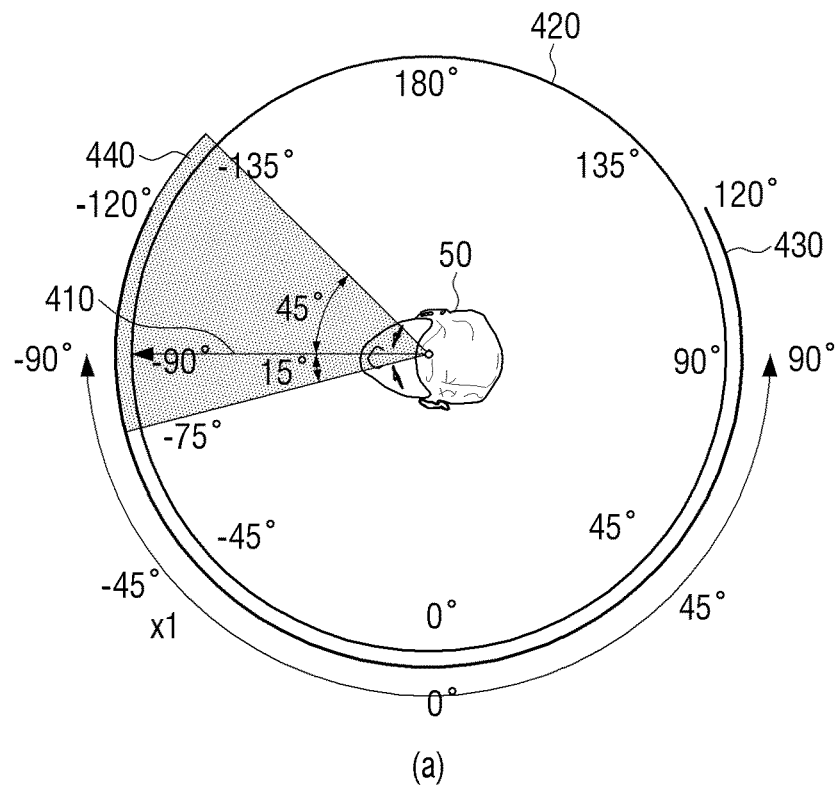
Figure 4C:
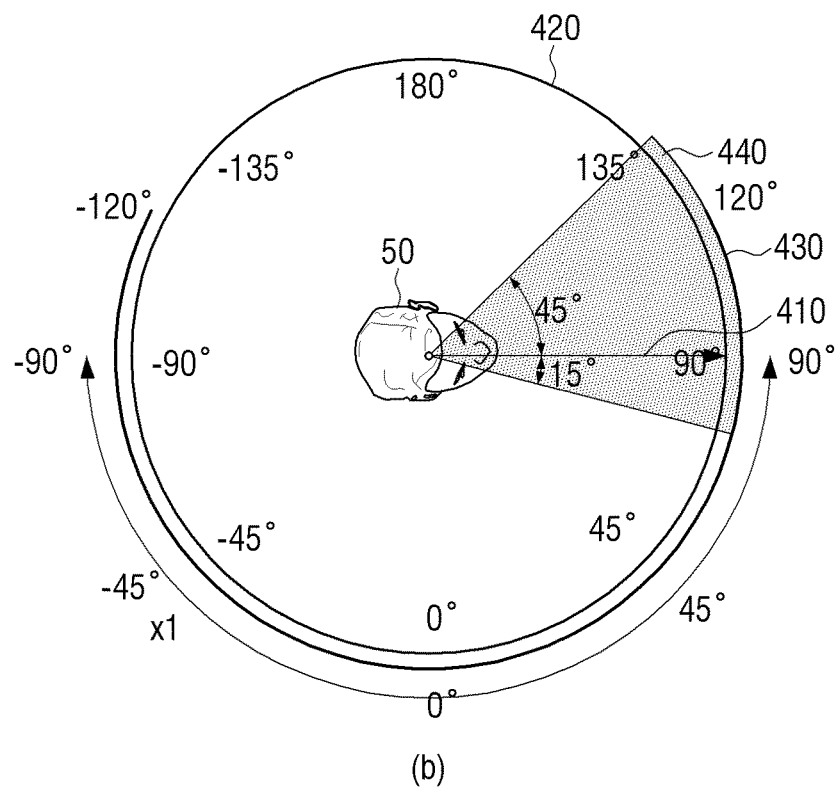

Referring to FIG. 4C, the directed direction 410 of the head 50 may exceed +/−60 degrees and indicate −90 degrees and +90 degrees. Referring to FIG. (c) of 4C, the HMD device may display the view region 440 at 15 degrees in a left direction and 45 degrees in a right direction based on the directed direction of −90 degrees from the VR image 420. That is, the HMD device may display the second portion 440, a right image of which has a larger size than a left image, of the VR image 420. Referring to (b) of FIG. 4C, the HMD device may a range at 15 degrees in a right direction and 45 degrees in a left direction based on the directed direction of +90 degrees from the VR image 420, as the view region 440. That is, the HMD device may display the second portion 440, a left image of which has a larger size than a right image, from the VR image 420. In this example, the HMD device may display the view region 440 corresponding to a different angle of +/−105 degrees from an angle of +/−90 degrees of the directed direction 410.

Figure 4D:
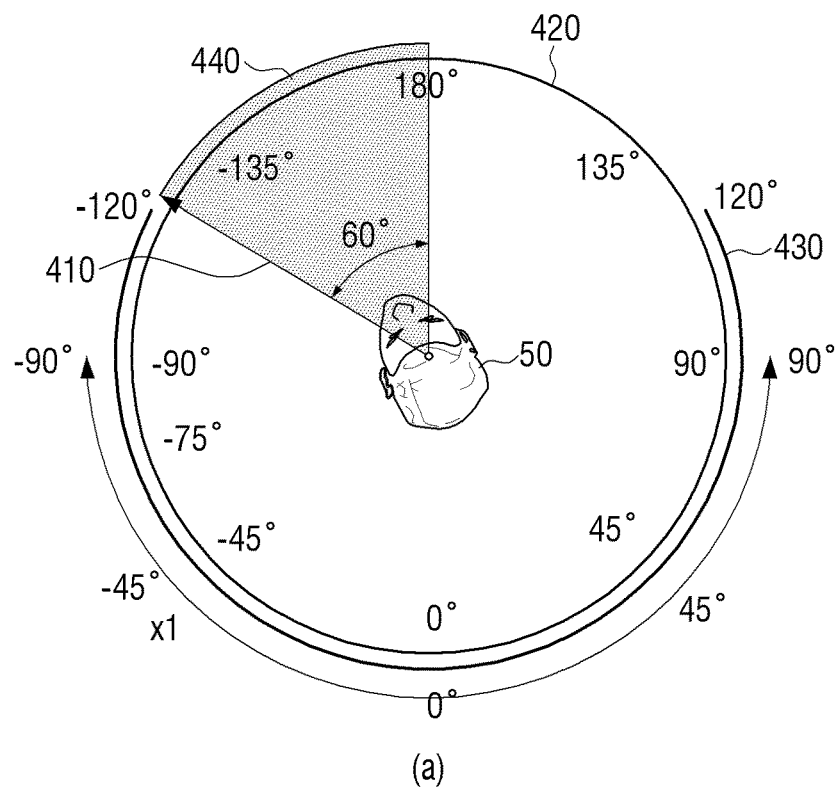
Figure 4D:
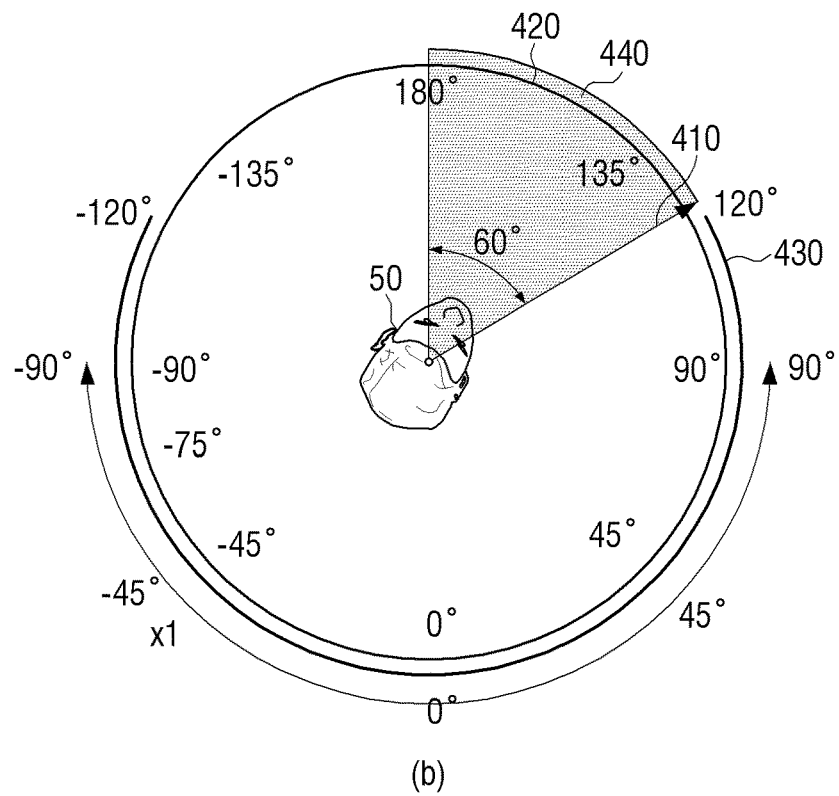

Referring to FIG. 4D, the directed direction 410 of the head 50 may indicate a maximum rotation range of −120 degrees and +120 degrees. Referring to (a) of FIG. 4D, the HMD device may display a range of 60 degrees in a right direction based on −120 degrees of the directed direction 410 from the VR image 420, as the view region 440. Referring to (b) of FIG. 4D, the HMD device may display a range of 60 degrees in a left direction based on +120 degrees of the directed direction 410 from the VR image 420, as the view region 440. As described above, the HMD device may display the entire VR image 440 in all directions of 360 degrees within a predetermined range 430 of +/−120 degrees.

In the aforementioned example, the HMD device may determine a range of a vision field displayed as the view region 440 from the VR image as 60 degrees to correspond to a range of 60 degrees in a forward direction, at which the human is correctly capable of recognizing an object, among binocular vision fields. However, this is merely an embodiment and, thus, a range of the view region 440 displayed by the HMD device may be wider or narrower than 60 degrees according to a size and focal distance of a display.

Figure 5:
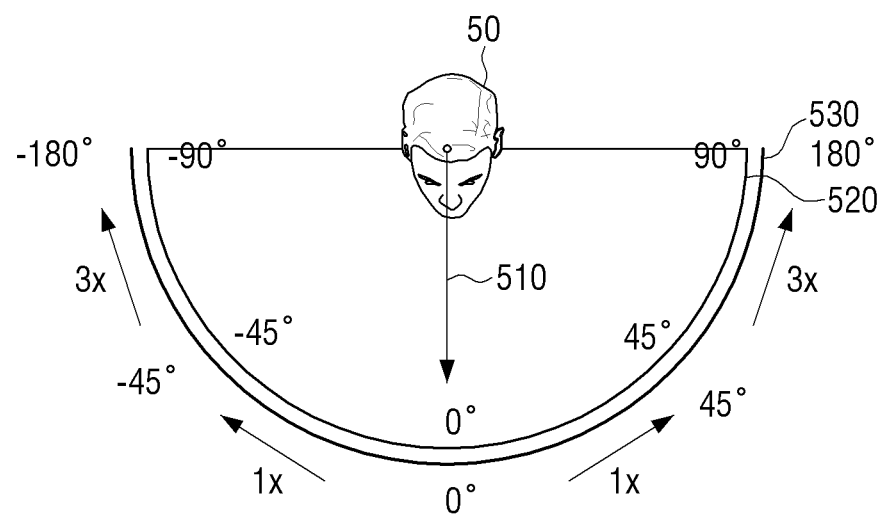
FIG. 5 is a diagram for explanation of a method of determining a region of a VR image, to be displayed to a user, of an HMD device according to another exemplary embodiment of the present disclosure.

FIG. 5 is a diagram for explanation of a method of determining a region of a VR image, to be displayed to a user, of an HMD device according to another exemplary embodiment of the present disclosure.

Referring to FIG. 5, a VR image 530 with all directions of 360 degrees to +180 degrees from −180 degrees may be mapped in a range of −90 degrees to +90 degrees, which is a predetermined turning radius. In a range in which a directed direction 510 of the head 50 is +/−45 degrees, a multiplier α may be 1 and the HMD device may display a view region corresponding to the same direction as the directed direction 510. In a range in which the directed direction 510 is equal to or greater than +/−45 degrees or equal to or less than +/−90 degrees, a multiplier α may be 3 and the HMD device may display a view region in a direction corresponding to an angle that is three times greater than an angle of the directed direction 510.

Although an angle of a directed direction is multiplied by a multiplier greater than 1 based on one threshold angle in the exemplary embodiment of FIG. 5, the present disclosure is not limited thereto and, thus, different multipliers may be multiplied based on a plurality of threshold angles and, as an angle of the directed direction 510 is increased, the multiplier may be gradually increased.

Figure 6:
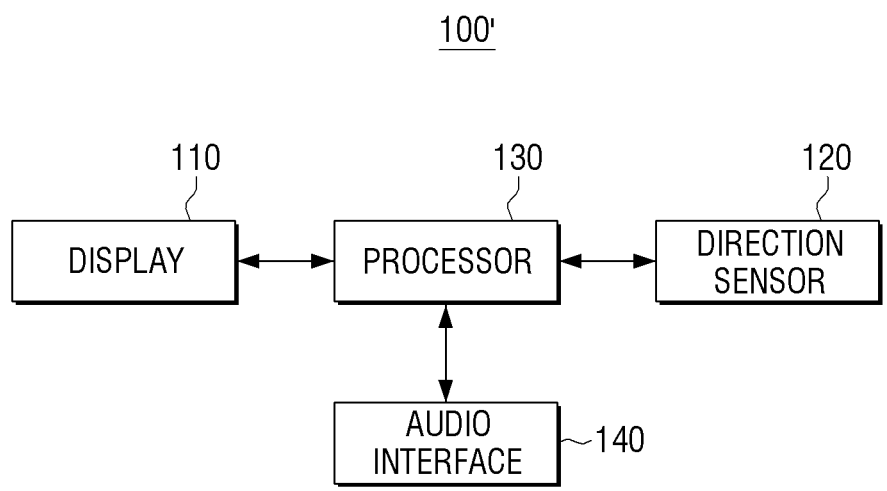
FIG. 6 is a block diagram showing a configuration of an HMD device according to another exemplary embodiment of the present disclosure.

FIG. 6 is a block diagram showing a configuration of an HMD device according to another exemplary embodiment of the present disclosure.

Referring to FIG. 6, a HMD device 100' may include the display 110, the direction sensor 120, the processor 130, and an audio interface 140.

The display 110 may display a view direction in a specific direction from a VR image for providing a VR service. A detailed configuration and function of the display 110 are the same as those of the display 110 of FIG. 2 and, thus, a repeated description thereof is omitted here.

The direction sensor 120 may detect a direction in which the HMD device 100' is directed. A detailed configuration and function of the direction sensor 120 are the same as those of the direction sensor 120 of FIG. 2 and, thus, a repeated description thereof is omitted here.

The audio interface 140 may output an audio signal. In detail, the audio interface 140 may be connected to a sound output device such as a speaker to output an audio signal for generating sound.

The audio interface 140 may output stereoscopic sound. In detail, the audio interface 140 may output a multichannel signal for outputting different sounds at different positions for a binaural effect based on a listener of the sounds.

The processor 130 may control each component of the HMD device 100' for providing a VR service. A detailed configuration and function of the processor 130 are the same as those of the processor 130 of FIG. 2 and, thus, a repeated description thereof is omitted here.

The processor 130 may control the audio interface 140 to output sound in such a way a direction in which a sound source reproduced by stereoscopic sound corresponds to a view region corresponding to a different direction from the directed direction detected by the direction sensor 120. In detail, content reproduced for a VR service may be multimedia content including audio and video and reproduced stereo sound may reproduce sound source with directivity in a 3D virtual space to correspond to a direction of the VR image. The processor 130 may display a view region corresponding to a different direction from the detected directed direction to display all VR images for providing a VR service within a predetermined turning radius range of the HMD device 100'. In addition, the processor 130 may control the audio interface 140 to reproduce a direction of a sound source to correspond to a direction of the displayed view region.

That is, the processor 130 may control the audio interface 140 to deviate a position of a sound source reproduced by a stereoscopic sound in a left or right side based on an original positioned to correspond to a provided second portion when the detected directed direction of the HMD device 100' is outside a predetermined range in which a first portion is displayed based on the user front and the second portion is provided.

Figure 7:
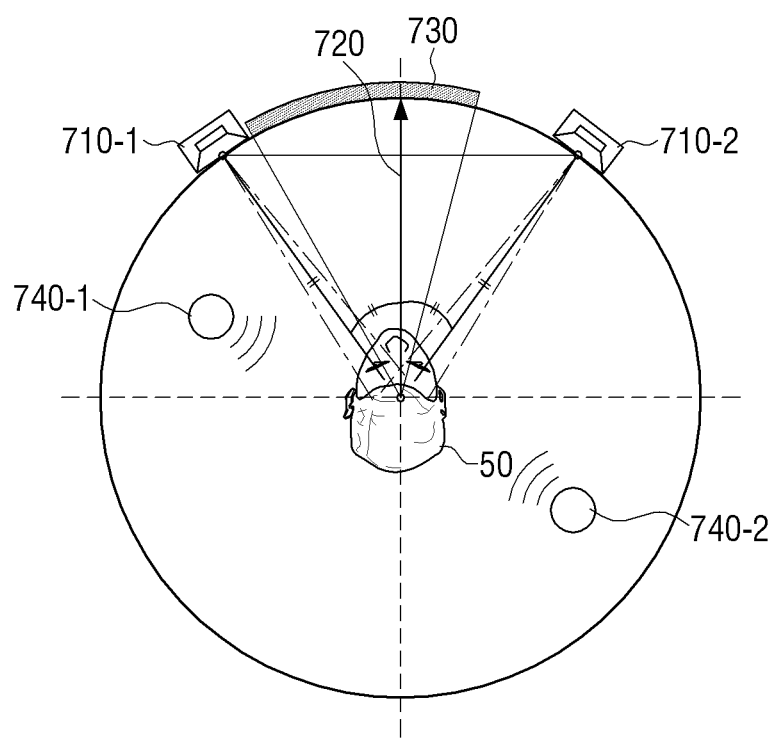
FIG. 7 is a diagram for explanation of a method of determining a position of a sound source for reproducing a stereoscopic image of an HMD device according to an exemplary embodiment of the present disclosure.

FIG. 7 is a diagram for explanation of a method of determining a position of a sound source for reproducing a stereoscopic image of an HMD device according to an exemplary embodiment of the present disclosure.

Referring to FIG. 7, stereo sound of two channels may be output by two left and right speakers 710-1 and 710-2 based on a position of the head 50 of a user.

The HMD device may display a second portion 730, a left image of which has a larger than a right image based on a directed direction 720 of the head 50. The HMD device may output an audio signal of two channels to reproduce sound sources 740-1 and 740-2 at a position corresponding to a direction of a view region 730 by the two speakers 710-1 and 710-2 connected to the audio interface. That is, a position of stereoscopic sound reproduced due to intensity and time difference of sounds received by two respective ears of a user to correspond to a directed to the reproduced second region 730 may be further turned (deviate in a left direction) in a left direction compared with an original target position based on the directed direction 720.

Figure 8:
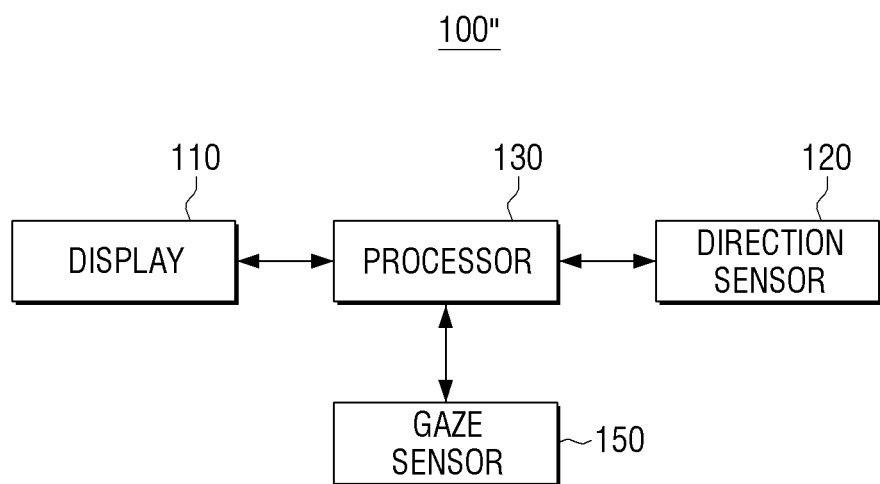
FIG. 8 is a block diagram showing a configuration of a HMD device according to another exemplary embodiment of the present disclosure.

FIG. 8 is a block diagram showing a configuration of a HMD device according to another exemplary embodiment of the present disclosure.

Referring to FIG. 8, an HMD device 100" may include the display 110, the direction sensor 120, the processor 130, and a gaze sensor 150.

The display 110 may display a view region in a specific direction from a VR image for providing a VR service. A detailed configuration and function of the display 110 are the same as those of the display 110 of FIG. 2 and, thus, a repeated description thereof is omitted here.

The direction sensor 120 may detect a direction in which the HMD device 100" is directed. A detailed configuration and function of the direction sensor 120 are the same as those of the direction sensor 120 of FIG. 2 and, thus, a repeated description thereof is omitted here.

The gaze sensor 150 may detect user gaze. In detail, the gaze sensor 150 may detect a direction in which a user wearing the HMD device looks. The gaze sensor 150 may use a method of recognizing a center of a pupil from an image formed by photographing two eyes.

The processor 130 may control each component of the HMD device 100" for providing a VR service. A detailed configuration and function of the processor 130 are the same as those of the processor 130 of FIG. 2 and, thus, a repeated description thereof is omitted here.

When detecting a directed direction at a position adjacent to an end of a predetermined turning radius range, the processor 130 may control the display 110 to display a view region corresponding to a direction that is further turned from a directed direction that is detected as a direction toward a position adjacent to the end of the turning radius range. In detail, when the HMD device 100" is directed toward a position adjacent to the end of the predetermined turning radius range, the processor 130 may control the display 110 to further enlarge a size of an image of a directed direction toward a position adjacent the end and to provide a second portion, opposite images of which are different based on the directed direction.

Figure 9:
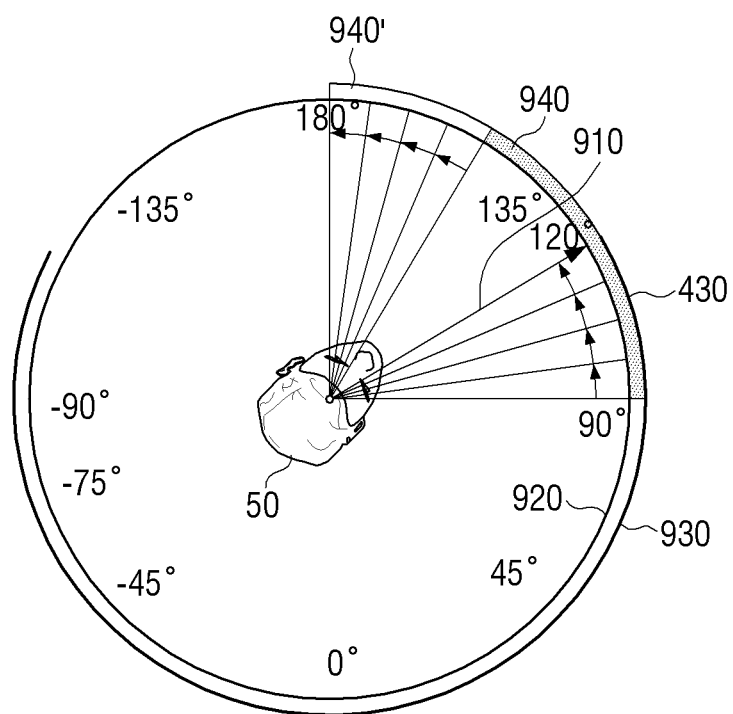
FIGS. 9 and 10 are diagrams for explanation of a method of converting a region of a VR image, to be changed, of an HMD device according to two exemplary embodiments of the present disclosure.

Referring to FIG. 9, the head 50 of the user may be directed in +120 degrees that is one of opposite ends of a predetermined turning radius 930. The HMD device may display a view region 940 in the same direction as a directed direction 910 from a VR image 920. The HMD device may check that the directed direction 910 is maintained in +120 degrees and may gradually rotate a direction in which the view region 940 is displayed. The HMD device may display a view region 940' corresponding to a turning direction to +150 degrees. That is, the HMD device may provide a second portion, a left image of which is larger. According to the present exemplary embodiment, the gaze sensor 150 may be omitted.

According to another exemplary embodiment of the present disclosure, when detected user gaze is directed to a position adjacent to an edge of a view region, the processor 130 may control the display 110 to display a view region corresponding to a direction that is further turned from the detected direction detected as the direction toward a position adjacent to the edge in which the gaze is directed. In detail, when the detected user gaze is directed toward a position adjacent to the edge of an image provided on a display, the processor 130 may control the display 110 to provide a second portion, a size of an image directed by the gaze of which is enlarged.

Figure 10:
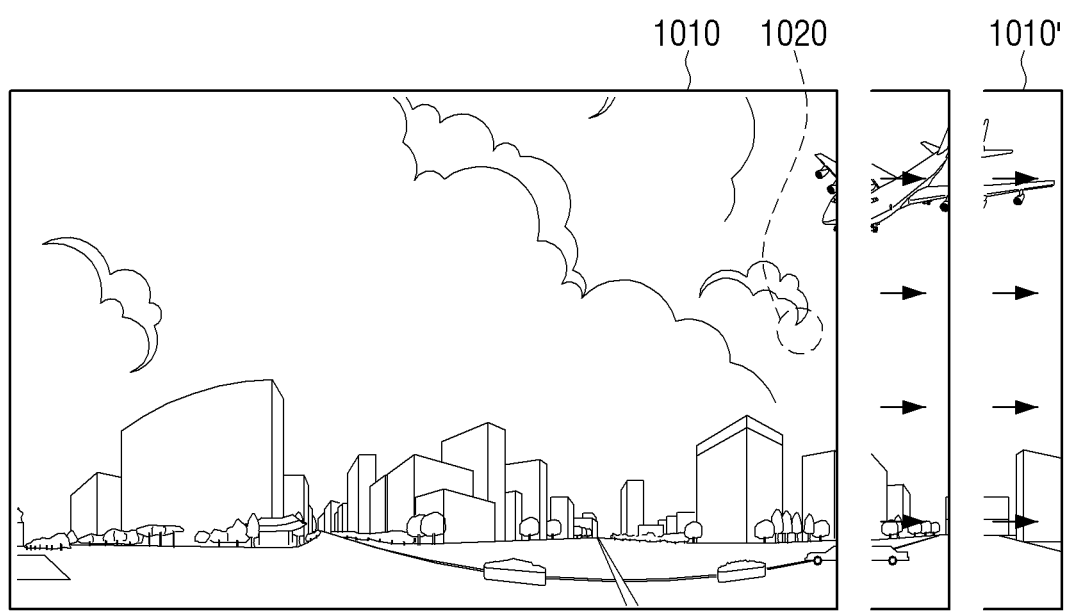

FIG. 10 shows a view region 1010 corresponding to a detected directed direction from a VR image. The HMD device may check that user gaze 1020 stays in a right edge of the view region 1010. The HMD device may turn a direction for displaying the view region 1010, in a right direction toward which the gaze 1020 is directed. The HMD device may display a view region 1010' that is turned to correspond to a different direction from the detected directed direction. That is, the HMD device provides a second portion, a right image of which is greater than a left image based on the directed direction.

When the directed direction is positioned at a position adjacent to an end of a predetermined turning radius, the detected gaze is directed toward an edge of a view region, and a direction turned in the directed direction and a direction of the edge toward which the gaze is directed in the view region correspond to each other based on the front, the HMD device may display a view region corresponding to a direction that is further turned from the directed direction.

The aforementioned HMD device may display an entire VR image in all directions according to movement of user head or gaze only within a direction in the predetermined turning range.

FIG. 11 is a flowchart for explanation of a method of controlling an HMD device according to an exemplary embodiment of the present disclosure.

Referring to FIG. 11, a method of controlling a HMD device for providing a service for providing a VR image may include, first, detecting a direction in which the HMD device is directed (S1110). In detail, the HMD device may detect a direction that is turned based on the front on a horizontal plane by a sensor. The HMD device may measure an azimuth on a horizontal plane, which indicates the detected directed direction.

Then, when the detected directed direction of the HMD device is changed within a predetermined range based on the user front, the HMD device may provide a first portion of the VR image (S1120). Here, the first portion may have left and right images with the same size based on the changed directed direction of the HMD device.

When the detected directed direction of the HMD device is changed to deviate from a predetermined range based on the user front, the HMD device may provide a second portion of the VR image (S1130). Here, the second portion may have left and right images with different sizes based on the changed directed direction of the HMD device. In more detail, the second portion may have a right image with a larger size than a left image when the directed direction of the HMD device is outside a predetermined range in a right direction based on the user front. On the other hand, when the directed direction of the HMD device is outside a predetermined range in a left direction based on the user front, the second portion may have a left image with a larger size than a right image.

That is, in operations S1120 and S1130, the HMD device may be configured to control a display to display a view region corresponding to the same direction as the detected directed direction for detecting a partial region based on the front from the VR image and to display the remaining region as a view region corresponding to a different direction from the detected directed direction.

To provide a second portion of the VR image, operation S1130 may include controlling a display to provide an image in a vision field directed at an angle obtained by multiplying an angle of the directed direction of the HMD device based on the user front with a positive multiplier greater than 1. Here, the multiplier may be varied according to an angle of the detected directed direction based on the front.

The aforementioned control method may further include setting a threshold angle corresponding to a predetermined range for displaying a first portion, left and right sides of which are symmetrical to each other based on the same direction as the directed direction from a predetermined turning radius. Here, the threshold angle may be determined as a minimum angle for providing a region of 180 degrees based on the user front from an entire VR image.

The method of controlling the HMD device may further include setting a maximum turning radius for turning the HMD device by turning the user head according to user input and, in this case, operation S1130 may include controlling the display to display a view region corresponding to a different direction from the detected directed direction to display an entire VR image within a predetermined turning radius range.

The method of controlling the HMD device may further include outputting stereoscopic sound. In this case, the HMD device may adjust a position of a sound source reproduced as stereoscopic sound to corresponding to the second portion provided in operation S1130.

According to an exemplary embodiment of the present disclosure, when a directed direction of the HMD device is detected at a position adjacent to a position of a predetermined turning radius, the HMD device may be controlled to provide a second portion, a size of one-side image of which is enlarged to correspond to a direction that is further turned in the direction corresponding to the position adjacent to the end.

The method of controlling the HMD device may further include detecting gaze of a user who wears the HMD device and, in this case, in operation S1130, when the detected user gaze is directed toward a position adjacent to the edge of the view region, the HMD device may be controlled to provide the second portion, a size of one-side image of which is enlarged to correspond to a direction toward the position adjacent to the edge.

In the aforementioned method of controlling the HMD device, all VR images in a predetermined turning radius or more may be displayed. The method of controlling the HMD device may be embodied by a display device for converting an image depending on a directed direction as well as each of the HMD devices shown in FIGS. 2, 6, and 8.

The method of controlling the HMD device according to various exemplary embodiments may be programmed and stored in various storage media. Accordingly, the aforementioned methods according to various exemplary embodiments may be embodied by various types of electronic devices for execution of a storage medium.

In detail, according to an exemplary embodiment of the present disclosure, a non-transitory computer readable medium for storing a program for sequentially executing detecting a directed direction of a HMD device and controlling the display of the HMD device to display a view region corresponding to a different direction from the detected directed direction from a VR image may be provided.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A head mounted display (HMD) device for displaying a virtual reality (VR) image, comprising:
   a display;
   a sensor; and
   a processor configured to:
      receive, from the sensor, direction information indicating a direction in which the HMD device is directed;
      based on the direction in which the HMD device is directed being changed in a predetermined range, control the display to display a first VR image; and
      based on the direction in which the HMD device is directed being changed to deviate from the predetermined range, control the display to display a second VR image,
   wherein the first VR image comprises a view region corresponding to the changed direction, and
   wherein the second VR image comprises a first view region corresponding to the changed direction and a second view region corresponding to a direction which is different from the changed direction.

2. The HMD device as claimed in claim 1, wherein the second VR image has a right viewing angle larger than a left viewing angle when the direction in which the HMD device is directed is right based on a user front and, has a left viewing angle larger than a right viewing angle when the direction in which the HMD device is directed is left based on the user front.

3. The HMD device as claimed in claim 1, wherein the processor sets a threshold angle corresponding to the predetermined range based on a user front, determines an azimuth to the direction in which the HMD device is directed from the user front, and controls the display to display the first VR image when the determined size of the azimuth is changed in a turning angle corresponding to the predetermined range and to display the second VR image when the determined size of the azimuth is changed to deviate from a turning angle corresponding to the predetermined range.

4. The HMD device as claimed in claim 3, wherein the threshold angle is a minimum angle for displaying a region in a range of 180 degrees in the user front through the first VR image.

5. The HMD device as claimed in claim 1, wherein the processor is configured to receive a user input for setting a maximum turning angle,
   set the maximum turning angle according to the user input, and
   control the display to display the second VR image to display a VR image with a front image in 360 degrees within the set maximum turning angle when the detected direction in which the HMD device is directed is changed to deviate from the predetermined range based on a user front.

6. The HMD device as claimed in claim 1, wherein the processor controls the display to display the second VR image with an enlarged size of an image toward a direction of a position adjacent to opposite ends when the direction in which the HMD device is directed is detected at the position adjacent to opposite ends of the predetermined rotation angle.

7. The HMD device as claimed in claim 1, further comprising a sensor configured to detect gaze of a user who wears the HMD device, wherein the processor controls the display to display the second VR image with an enlarged size of an image toward a direction of a position adjacent an edge when the detected gaze of the user is directed toward the position adjacent to the edge of an image displayed to the display.

8. The HMD device as claimed in claim 1, further comprising an audio interface configured to output stereoscopic sound,
wherein the processor controls the audio interface to allow a position of a sound source reproduced by the stereoscopic sound to deviate from any one of left and right sides to correspond to the second VR image displayed by the display when the detected direction in which the HMD device is directed is changed to deviate from the predetermined range based on the user front.

9. The HMD device as claimed in claim 1, wherein the processor controls the display to display, as the second VR image, an image of a vision field toward an angle obtained by multiplying an angle of the direction of the HMD device is directed based on the user front with a positive multiplier greater than 1.

10. The HMD device as claimed in claim 9, wherein the multiplier is varied according to the angle of the direction of the HMD device is directed based on the user front.

11. A method of controlling a head mounted display (HMD) device for displaying a virtual reality (VR) image, the method comprising:
receiving, from a sensor, direction information indicating a direction in which the HMD device is directed;
based on the direction which the HMD device is directed being changed in a predetermined range, displaying a first VR image; and
based on the direction in which the HMD device is directed being changed to deviate from the predetermined range, displaying a second VR image,
wherein the first VR image comprises a view region corresponding to the changed direction, and
wherein the second VR image comprises a first view region corresponding to the changed direction and a second view region corresponding to a direction which is different from the changed direction.

12. The method as claimed in claim 11, wherein the second VR image has a right viewing angle larger than a left viewing angle when the direction in which the HMD device is directed is right based on a user front and, has a left viewing angle larger than a right viewing angle when the direction in which the HMD device is directed is left based on the user front.

13. The method as claimed in claim 11, wherein the controlling comprises:
setting a threshold angle corresponding to the predetermined range based on a user front;
determining an azimuth to the direction in which the HMD device is directed from the user front; and
controlling the display to display the first VR image when the determined size of the azimuth is changed in a turning angle corresponding to the predetermined range and to display the second VR image when the determined size of the azimuth is changed to deviate from a turning angle corresponding to the predetermined range.

14. The method as claimed in claim 13, wherein the threshold angle is a minimum angle for displaying a region in a range of 180 degrees in the user front from the first VR image.

15. The method as claimed in claim 11, further comprising:
receiving a user input for setting a maximum turning angle and setting the maximum turning angle according to user input,
wherein the controlling comprises controlling the display to display the second VR image to display a VR image with a front image in 360 degrees within the set maximum turning angle when the detected direction in which the HMD device is directed is changed to deviate from the predetermined range based on a user front.

* * * * *